United States Patent
Kaufman et al.

(10) Patent No.: US 6,659,872 B1
(45) Date of Patent: Dec. 9, 2003

(54) ELECTRONIC GAME METHOD AND APPARATUS IN WHICH A MESSAGE IS FORTUITOUSLY PASSED BETWEEN PARTICIPATING ENTITIES

(75) Inventors: Henry Kaufman, Cambridge, MA (US); Tinsley A. Galyean, III, Cambridge, MA (US); Bruce D. Wyman, Jr., Belmont, MA (US)

(73) Assignee: Nearlife, Cambridge, MA (US)

( * ) Notice: Subject to any disclaimer, the term of this patent is extended or adjusted under 35 U.S.C. 154(b) by 175 days.

(21) Appl. No.: 09/820,055

(22) Filed: Mar. 28, 2001

(51) Int. Cl.[7] .......................... A63F 13/00; A63F 9/24; G06F 17/00; G06F 19/00
(52) U.S. Cl. .................... 463/40; 463/1; 463/41; 463/42; 345/473; 345/335; 709/206; 709/226
(58) Field of Search .............................. 463/1–9, 16–22, 463/40–42; 345/473, 335, 327; 709/206, 226

(56) References Cited

U.S. PATENT DOCUMENTS

| | | | |
|---|---|---|---|
| 6,416,414 B1 * | 7/2002 | Stadelmann | 463/42 |
| 6,430,602 B1 * | 8/2002 | Kay et al. | 709/206 |
| 6,434,398 B1 * | 8/2002 | Inselberg | 455/517 |
| 6,434,597 B1 * | 8/2002 | Hachiya et al. | 709/202 |
| 6,477,390 B1 * | 11/2002 | Gum et al. | 455/550 |

OTHER PUBLICATIONS

Website http://www.matsuda.com/jun/bm/what.html. See attached screen print and note.

* cited by examiner

*Primary Examiner*—Teresa Walberg
*Assistant Examiner*—Robert Mendoza
(74) *Attorney, Agent, or Firm*—Kudirka & Jobse, LLP

(57) ABSTRACT

A message generated by an originator participant is entered into a "bottle" that passes the message from participant to participant. The bottle may be a hand-held device that is capable of directly communicating with another such device. When the originator is located close enough to another participant who also has such a hand-held device, the devices communicate and the message is passed from the originator to the other participant. The bottle may be a hand-held device that is capable of communicating with a central base station, such as a pager or cell phone or a computer that communicates with the base station via the Internet. When the originator enters a message into the device, a program at the base station selects a participant from the list to receive the message and the message is sent to the other participant. The selection of a participant to receive a message can be random, based on geographical areas, virtual geographic areas or other criteria such as whether the hand-held device is activated when an attempt is made to transfer a message.

46 Claims, 5 Drawing Sheets

ELECTRONIC GAME METHOD AND APPARATUS IN WHICH A MESSAGE IS FORTUITOUSLY PASSED BETWEEN PARTICIPATING ENTITIES

FIELD OF THE INVENTION

This invention relates to electronic game apparatus in which a message generated by a participant is passed from participant to participant in a random manner.

BACKGROUND OF THE INVENTION

The occurrence of a chain of random events is frequently of interest to people, both for educational and entertainment value. One well-known example is the familiar "message in a bottle" scenario in which a first person, perhaps located in a remote and isolated location, composes a message on a piece of paper. The paper is placed in a sealed container, such as a bottle, and cast into the sea. Unknown currents, tides and winds take the floating bottle to other locations. The bottle may be lost forever or it may wash up on a distant shore where it is found by another person. That person may choose to respond to the message or they may replace the message in the bottle and set the bottle adrift once more. Eventually, the message is lost or someone chooses to respond to the sender often from a distant and unexpected location. The result depends on a series of unconnected events that ultimately generate a conclusion that is both entertaining and informative.

It might be interesting to play a game that simulates such an experience; however, a game that uses a real container floating the ocean is impractical because it might take years to receive a response. In addition, in most cases, currents, winds and tides are a little too random for reliable dissemination so that in many cases, the bottle would be lost and no response obtained.

A more practical approach might be to use and electrical analog of such a game. However, existing electronic encounter devices do not mimic the message in a bottle scenario to any great extent.

SUMMARY OF THE INVENTION

In accordance with one illustrative embodiment of the invention, a message generated by an originator is entered into a hand-held device that is capable of directly communicating with another such device. For example, this direct communication may be accomplished via limited range radio broadcasts. When the originator is located close enough to another participant who also has such a hand-held device, the devices communicate and the message is passed from the originator to the other participant. The participant may chose to send a reply message to the originator and the participant's device may then commence broadcasting the message. In this manner, a message is passed from participant to participant in a random manner as participants pass each in the course of normal activities.

In accordance with another illustrative embodiment of the invention, a message generated by an originator is entered into a hand-held device that is capable of communicating with a central base station. Such devices may be pagers or cell phones. When the originator enters a message into the device, it communicates with the base station where a list of game participants is stored. A program at the base station selects a participant from the list to receive the message and the message is sent to the other participant. The participant may chose to send a reply message to the originator. The program at the base station then selects another participant to receive the message. In this manner, a message is passed from participant to participant. The selection of the participants to receive the message can be based on a number of factors. For example, the selection of a participant to receive a message can be a random selection. Alternatively, the selection may be based on geographical areas, virtual geographic areas or other criteria such as whether the hand-held device is activated when an attempt is made to transfer a message.

In still another embodiment, a message generated by an originator is entered into a computer that communicates with other computers via a network, such as the Internet. When the originator enters a message into the computer, it communicates with a server located on the network where a list of game participants is stored. A program at the server selects a participant from the list to receive the message and the message is sent to the other participant. The participant may chose to send a reply message to the originator. The program at the server then selects another participant to receive the message. As with the hand-held devices, the selection of the participants to receive a message can be random or based on geographical areas, virtual geographic areas or other criteria.

In another embodiment in which a central station or server is used, a participant may be asked to "rank" each received message based on any number of criteria, such as interest, preference or other personal criteria. These rankings are stored along with each participant's information at the central station or server. Later, when the message program is selecting a participant to whom a message will be sent, the rankings are used to select the participant. In this manner, participant's can receive messages which have more interest or which they prefer more.

In yet another embodiment, each participant is assigned a "home area" in a virtual geographic "world" so that messages are more likely to be sent to participants in areas which are nearby an area in which a participant has recently received a message. A display of the virtual world may be provided which illustrates the messages circulating any given area and their general content. A participant may be able to "move" his virtual home area to an area in which messages of interest are circulating. In this manner, the participant will increase the likelihood of receiving a message of particular interest.

BRIEF DESCRIPTION OF THE DRAWINGS

The above and further advantages of the invention may be better understood by referring to the following description in conjunction with the accompanying drawings in which.

DETAILED DESCRIPTION

Figure 1:
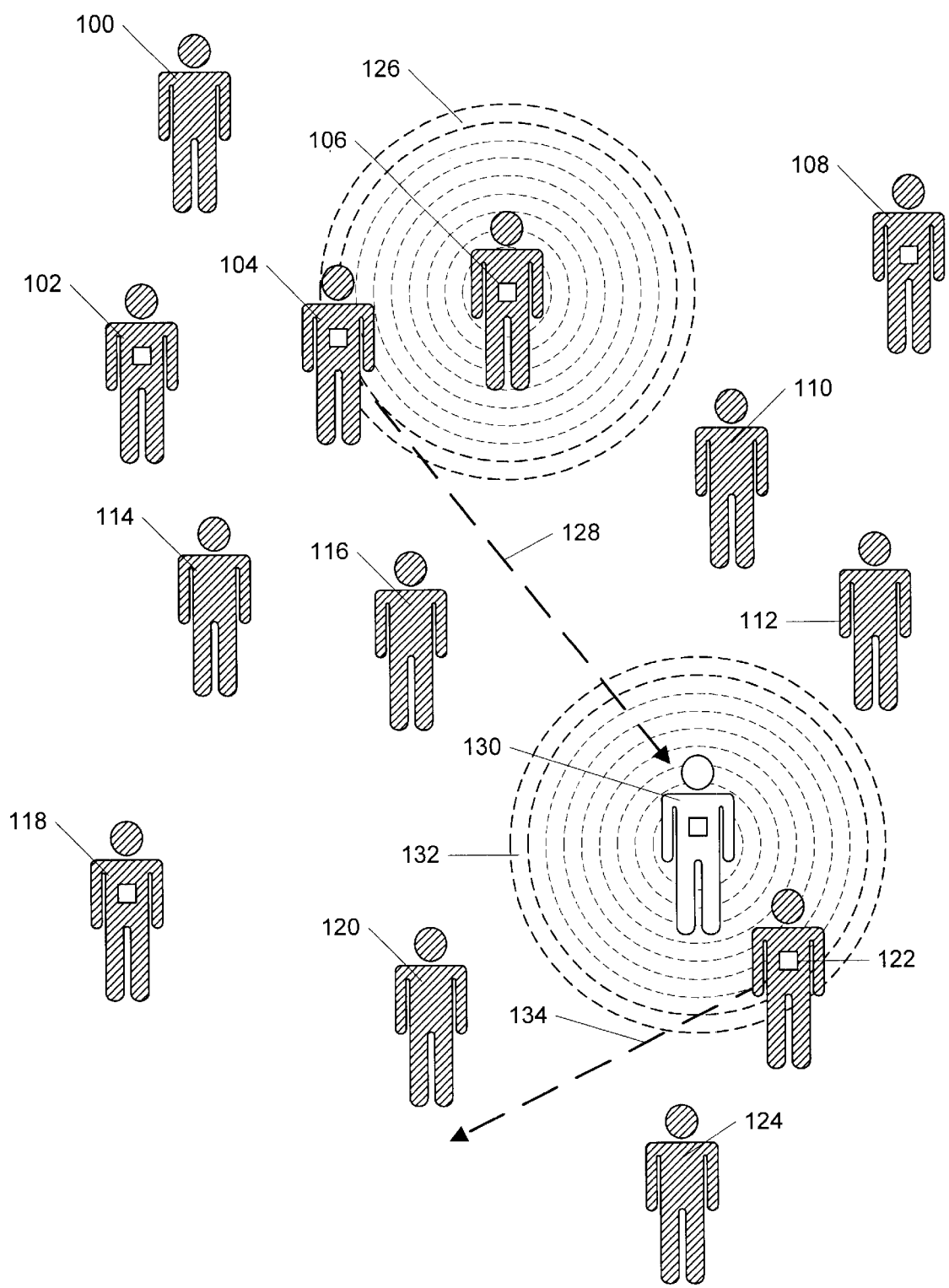
FIG. 1 is a schematic diagram illustrating an embodiment of the invention implemented with handheld wireless devices that communicate directly via limited range radio transmissions.
Figure 2:
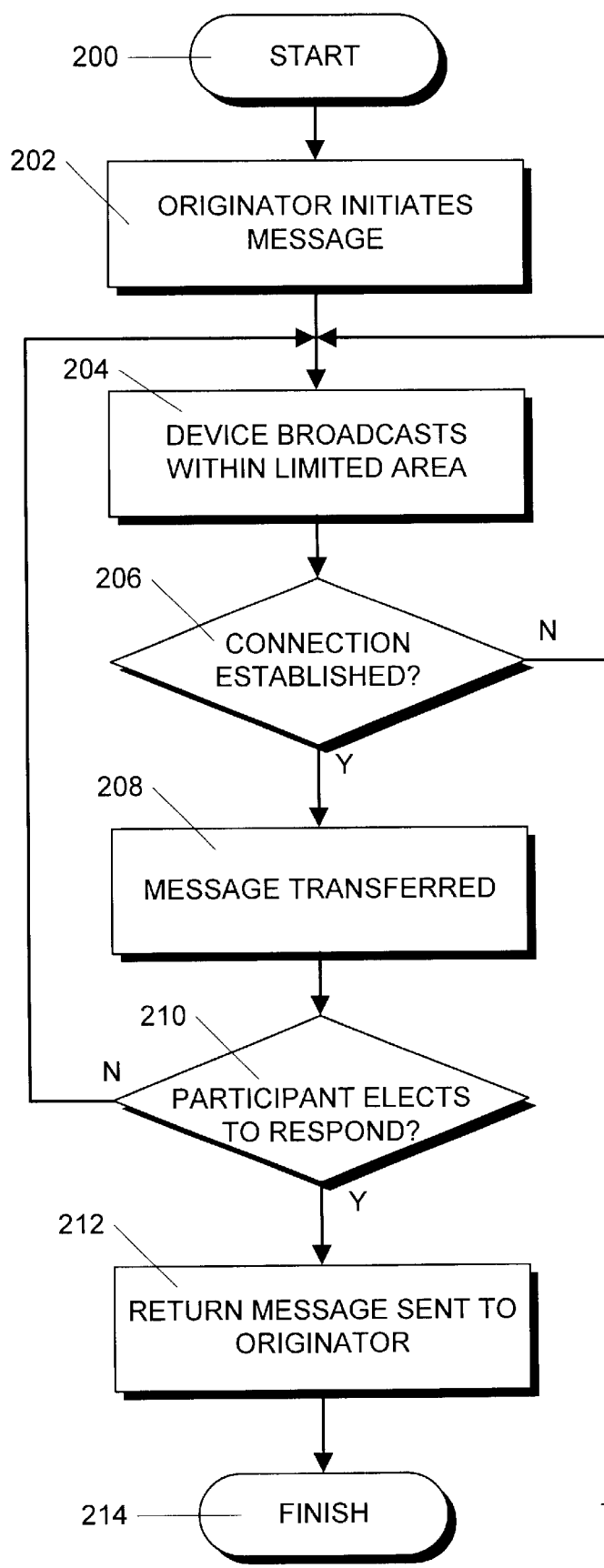
FIG. 2 is a flowchart showing steps in an illustrative message passing process used in the implementation shown in FIG. 1.

The embodiments described below are based on the concept of a "bottle" owned or controlled by each participant. The bottles generate and store information that is passed from participant to participant. Depending on the implementation, these bottles could be special hand-held devices or conventional pagers, cell phones or computers. Each "bottle" has a memory that can receive and store the message and some mechanism, which depends on the implementation, for transferring the message to another bottle. FIGS. 1 and 2 illustrate an implementation of one embodiment of the invention in which the bottles are small hand-held devices that communicate by means of radio transmissions broadcast over a limited area. With these devices, when two participants are located in close proximity to each other, either by walking past each other or by visiting the same establishment, such as a restaurant, the two hand-held devices can automatically establish a radio link to transfer information.

The hand-held devices utilize a conventional wireless technology to communicate. In accordance with this technology, a radio transceiver embedded within each hand-held device broadcasts a coded radio signal within a geographically limited area. When the broadcasting areas of two such devices overlap, the devices automatically establish a communication link. Wireless technology that is suitable for use with the invention is the currently available Bluetooth™ technology. The radio transceiver in devices constructed with this technology operates in a bandwidth, such as 2.4 gigaHertz, that is globally available. The transceiver is designed to operate in a noisy radio environment and to provide fast, robust and secure connections between devices. In order to accomplish this, the transceiver uses a full duplex data exchange rate of up to 1 mb/s and a frequency-hopping scheme that insures security and avoids interference from other signals after transmitting or receiving a data packet.

A typical scenario using these devices is illustrated in FIG. 1. In this arrangement, a number of participants are engaged in activities in a crowded environment. Participants, for example, are illustrated in 102, 104, 106, 108, 118 and 122. Other non-participants 100, 114, 116, 110, 112, 120 and 124 may also be present in the area.

The process by which messages are transferred is illustrated in a flowchart shown in FIG. 2. This process starts in step 200 and proceeds to step 202 where a participant/originator creates a message in his hand-held device thereby initiating the "bottle" which will carry the message to other participants. The message will generally be created by the originator by typing or otherwise entering the message into the device. However, it is also possible for an originator to create a message on a conventional computer and then download the message to the device by means of a conventional cable link between the computer and the device. In this latter case, the device would not need a keyboard or entry mechanism. The device then stores the message until it can be transmitted to another device as described below.

When activated in step 204, the device establishes a broadcast pattern within a limited area. For example, assuming participant 106 is the originator of a message, the broadcast area is indicated by dotted circles 126. Since the transmission area is limited, the message will not be transmitted unless another participant with a similar hand-held device passes within predetermined distance.

In step 206, the device transceiver monitors transmissions to determine whether a connection has been established. If not, the process returns to step 204 where the device continues to broadcast within its own limited area.

When another participant having a suitable hand-hand device enters the transmission area, a message transfer sequence is initiated. Such a participant is indicated in FIG. 1, for example, by participant 104. During this transmission sequence, the process shown in FIG. 2 proceeds from step 206 to step 208 where the message stored in the originator's hand-held device is transferred from the originator's hand-held device to the other participant's hand-held device. The receiving participant may be notified when this transfer occurs or the transfer may occur surreptitiously so that later when a participant examines his hand-held device, he will find that a message has been transferred to the device but will not know the origin of the message.

At this point, the participant may elect to respond to the message or may simply elect to re-transmit the message onto another participant. If the participant elects not to respond to the message, the process returns to step 204 in which the new participant's hand-held device broadcasts within a limited area. Alternatively, in step 210, the participant elects to respond and a return message is sent to the originator in step 212 and the process finishes in step 214. This return message may be sent by any conventional means. For example, the message could include an e-mail address and the return message could be sent via a conventional e-mail system.

Alternatively, after the return message is sent to the originator 106 in step 212, the message may continue to be transmitted from participant to participant. Since the hand-held device broadcasts in only a limited area, participants who may be in the area of the originator 106, but not within the broadcast area, such as participants 102 and 108, will not receive the message. Thus, the transmission between participants is a random event that involves two participants coming within a predetermined distance.

Once the message has been transmitted from originator 106 to participant 104 further transmissions may take place. For example, assume that participant 104 moves to another location, such as location 130, as indicated by arrow 128. Now the device broadcast area 132 has also moved such that another participant 122 is within the broadcast area. In this case, the message is passed between participant 104 and participant 122. Participant 122 may then move to another area as indicated by arrow 134 where the process is then repeated. Again, since the transmissions only occur over a limited area, other participants, such as participant 118, who may be near participant 104, do not receive the message.

In this manner, a message is passed randomly from participant to participant much in the same way as message in a bottle passes from participant to participant as driven by various tides and currents.

Figure 3:
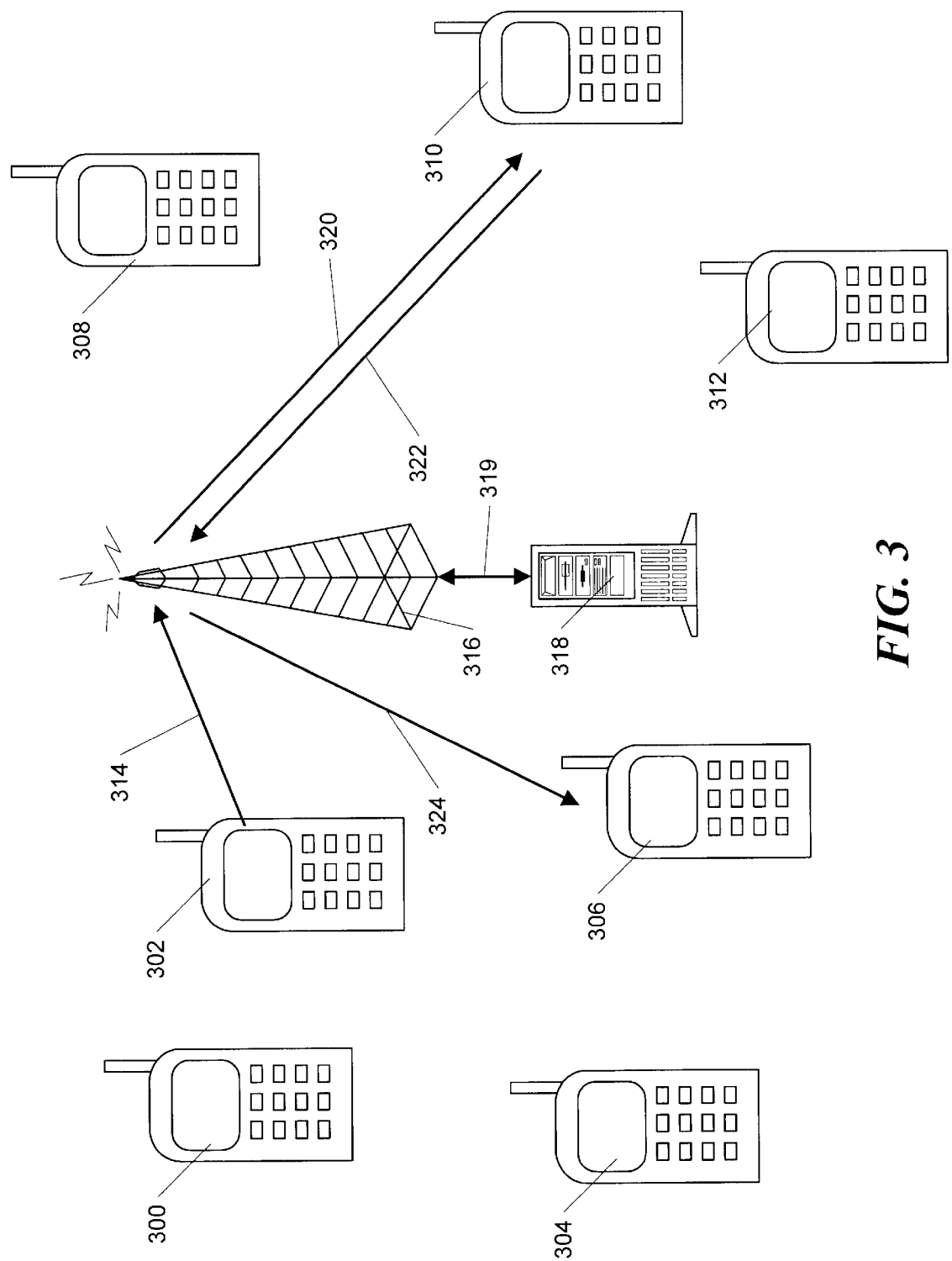
FIG. 3 is a schematic diagram illustrating another embodiment of the invention implemented with handheld wireless devices that communicate with a base station.

There are alternative ways to implement this type of game using other mobile wireless devices as "bottles." These devices can include pagers and cell phones. In another embodiment, a plurality of such hand-held devices, such as devices 300–312, communicate with a centralized broadcast system that is schematically represented by tower 316. Although only one broadcast tower or node is shown in FIG. 3, there may be many towers or nodes connected together as is common in a conventional cellular or pager network. A server 318 is connected to the network as shown schematically by arrow 319.

The wireless devices act as clients and, depending on the sophistication of each device, the messages may include text, voice recordings, video clips, audio clips and other graphics. Some wireless devices can be programmed with a client program. In some embodiments, the client program may be downloaded from the server 318. In other embodiments, the program can by downloaded over a cable from a personal computer. Still other devices have a web access protocol (WAP) browser that can act as a client program built into the device.

If a device can be programmed, the client program can automatically establish communications with the server 318 when the device is turned on or the user indicates to the device a desire to participate in the inventive game. Other, less sophisticated devices, cannot be programmed. In this case, the user would control the device to call a predetermined number, and the centralized network would then connect the device to the server 318. Once the device is connected to the server, the built-in message transfer capabilities of the device can be used to transfer messages between the device and the server.

In order to initialize the game, all of the game participants are required to register with the centralized server 318 which maintains a list of participants and ID codes or numbers which can be used to access the hand-held devices 300–312. This registration might be performed, for example, through the use of a web site or by using the hand-held devices to contact a predetermined site where participant information can be gathered by operators or by keying the information into the hand-held device.

Figure 4:
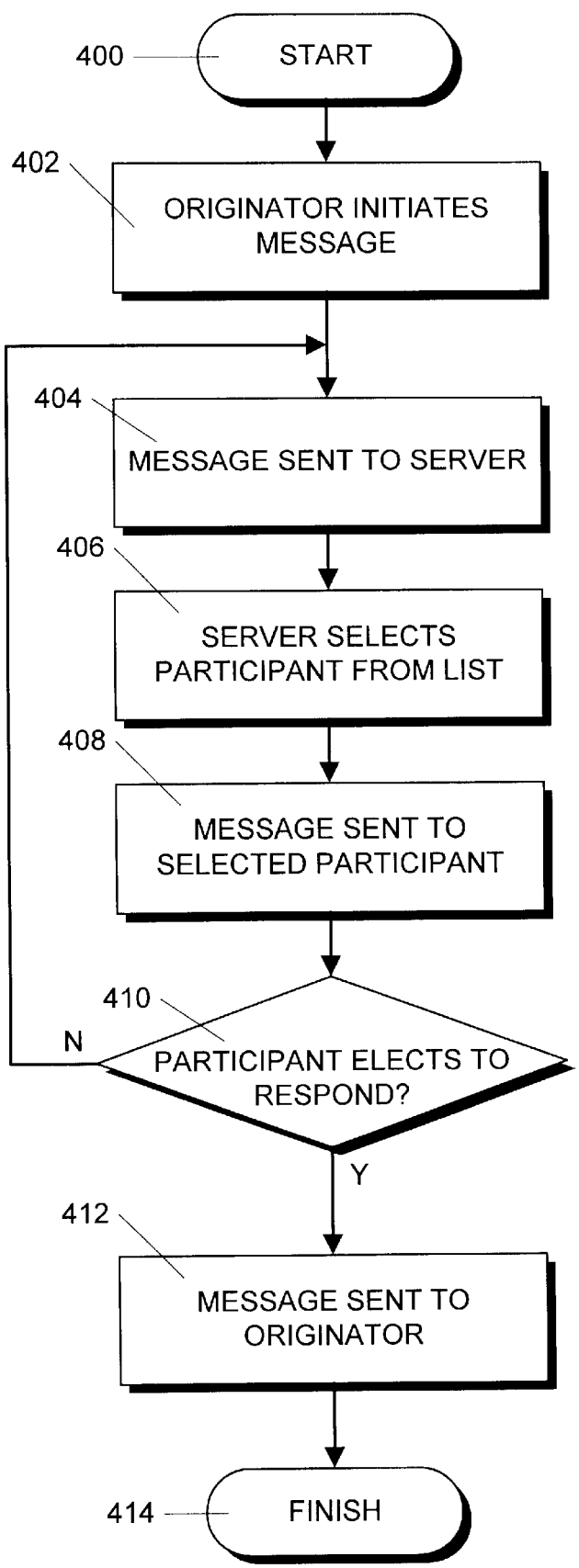
FIG. 4 is a flowchart showing steps in an illustrative message passing process used in the implementation shown in FIG. 3.

Once the game has been initialized and all participants registered, the operation of the system illustrated in FIG. 3 is described in FIG. 4. In particular, the illustrative process starts in step 400 and proceeds to step 402 where an originator initiates a message as described in connection with the previous embodiment. For purposes of illustration, the originator might be the owner of hand-held device 302.

In step 404, the message is sent to the server 318, as indicated schematically by arrow 314. In particular, in order to transmit this message, the hand-held device 302 communicates with the transmission network 316 in a conventional manner. The message is passed through the transmission network 316 to the server 318.

In step 406, the server selects a participant from the list it maintains. This selection can be made randomly or, as discussed below, in accordance with another criteria. Next, in step 408, the message is sent to the selected participant. For example, the server 318 may send, via the network 316, the message generated by the originator to the hand-held device 310 as indicated schematically by arrow 320.

In step 410, the participant that receives the message may elect to respond to the message. If the participant does not elect to respond, then the participant can notify the server that no response message is being generated. Alternatively, if in step 410, the participant who receives the message elects to respond, then, in step 412, a response message is sent to the originator as indicated by arrow 312, via transmission network 316. The process then finishes in step 414.

Whether the participant who receives the message elects to respond to the message or not, the server then selects another participant from its stored participant list and forwards the message to that participant, as indicated schematically by arrow 324.

Figure 5:
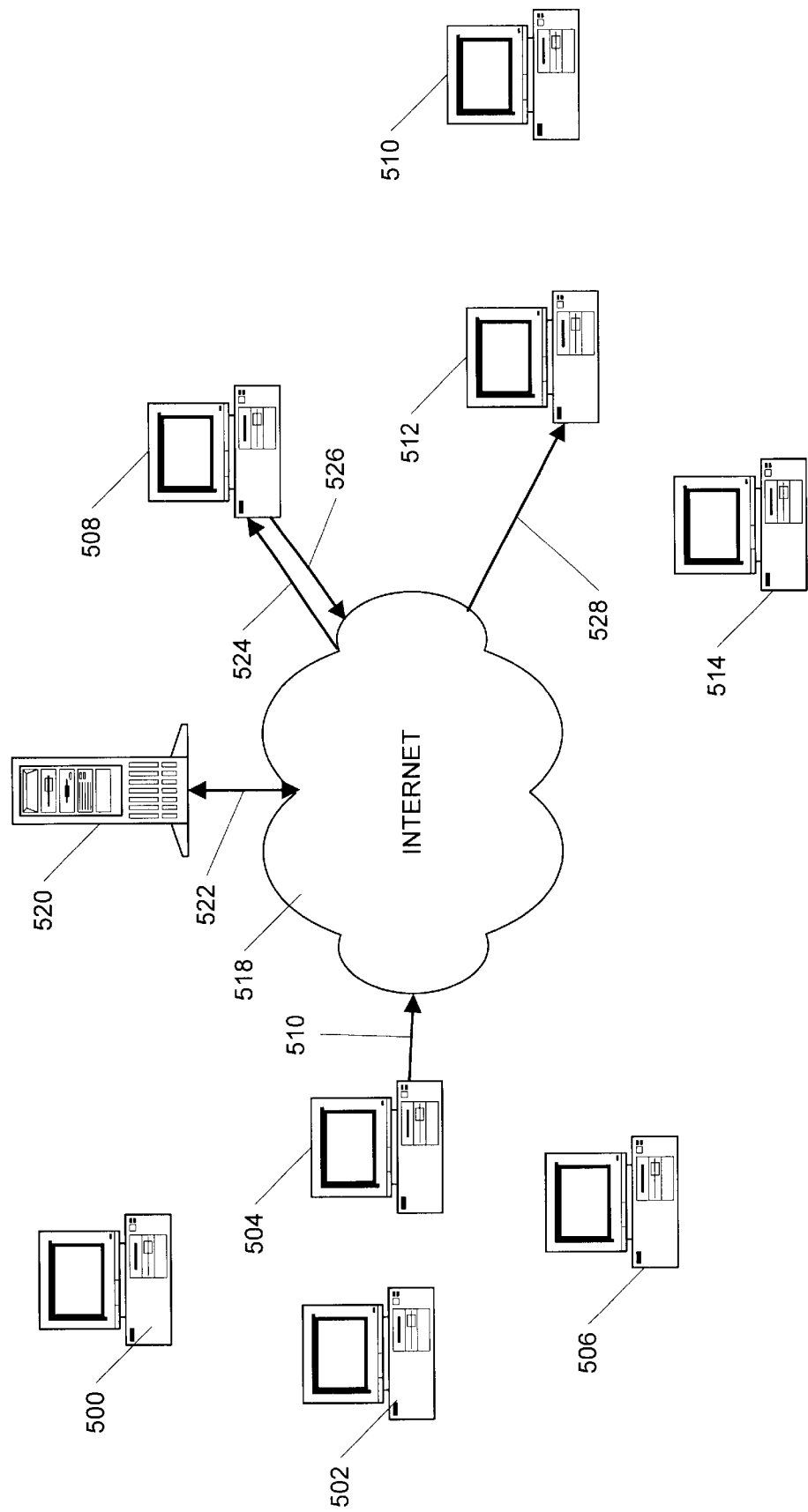
FIG. 5 is a schematic diagram illustrating still another embodiment of the invention implemented with computers that communicate with a server via a network, such as the Internet.

The inventive game may also be implemented via the Internet, as shown schematically in FIG. 5. In this embodiment, the "bottles" are computers that can be either hand-held or conventional desktop computers. In FIG. 5, a plurality of participants are represented by computers 500–514. These participant computers communicate with a server 520, via the Internet 518. As with the previous embodiment, the participants must register with the server 520 in order to initialize the game. Thereafter, the server 520 maintains a list of game participants.

An originator participant, as represented by computer 504, can originate a message and send it schematically, as indicated by arrow 510, via Internet 518 to server 520 as indicated by arrow 522. The message can be a conventional e-mail message comprised of text and graphics. Alternatively, the message may be a specially designed web page created with conventional HTML code.

The operation of the server 520 is essentially the same as the operation of the server 318 in the previously embodiment. In particular, the server 520 selects a participant from its stored participant list and forwards the message to that participant, as indicated by arrow 524. For purposes of illustration, the selected participant is assumed to be represented by participant computer 508. The participant at this computer may elect to respond to the message as schematically indicated by arrow 526 or not. In any case, the message is subsequently forwarded by server 520 to another selected participant, for example, participant 512 as indicated schematically by arrow 528.

In the embodiments discussed above which use a server, many different criteria may be used to select the next participant to receive a message. For example, the participant may be selected randomly from the stored participant list. In another embodiment, the message may be sent to the first participant whose device or computer is active or on-line. However, other criteria may also be used which can tailor messages to a participant's preferences. For example, a participant may be requested to "rate" each message on a predetermined scale. The participant can also indicate preferences for message types. These ratings are conveyed to the server and used to influence the selection of the next participant to receive a message. In this manner, a participant can increase the probability that messages that other participants have rated as a particular type will, at some point, be forwarded to them.

Additionally, the notion of a "virtual home area" can be introduced. In this embodiment, each participant is assigned a home area. The server selection process is adjusted so that there is a higher probability that messages generated by participants in a given area will be sent to other participants also located in that area. This adjustment creates the virtual equivalent of an "eddy" in the "currents" that carry the messages. In another embodiment, a map graphic can be provided on a web site. This map graphic shows the locations of the various home areas and the types of messages circulating in these areas based, for example, on participant ratings. A mechanism can be provided to allow a participant to change his home area if another area has circulating messages that are of more interest than the messages in his current home area.

A software implementation of the above-described embodiment may comprise a series of computer instructions either fixed on a tangible medium, such as a computer readable media, e.g. diskettes, CD-ROMs, ROMs, or fixed disks, or transmittable to a computer system, via a modem or other interface device over a medium. This medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. Other aspects such as the specific configuration of logic and/or instructions utilized to achieve a particular function, as well as other modifications to the inventive concept are intended to be covered by the appended claims.

What is claimed is:

1. A game apparatus in which a message is passed between a plurality of participating entities, comprising:
   a server containing a list of participants;
   a bottle controlled by each participating entity, the bottle having a storage for storing a message and a mechanism for establishing a temporary transmission link with the server;
   an entry mechanism for originating a message and storing the message in one of the bottles;
   a transfer mechanism which transfers a message stored in a first bottle to the server; and
   a selector in the server that selects a participant from the participant list and sends the message received from the first bottle to the bottle controlled by the selected participant wherein the selector in the server selects a participant from the participant list based on message rating information entered by participants.

2. A method for playing a game in which a message is passed between a plurality of participating entities, comprising:
   (a) creating a server containing a list of participants;
   (b) providing a bottle to each participating entity, the bottle having a storage for storing a message and a mechanism for establishing a temporary transmission link with the server;
   (c) originating a message and storing the message in one of the bottles;
   (d) using a transfer mechanism to transfer a message stored in a first bottle to the server; and
   (e) using the server to select a participant from the participant list and send the message received from the first bottle to the bottle controlled by the selected participant wherein the server selects a participant from the participant list based on message rating information entered by participants.

3. A computer program product for playing a game in which a message is passed between a plurality of participating entities, the computer program product comprising a computer usable medium having computer readable program code thereon, including:

program code in a server for creating a list of participants;
   program code for providing a bottle to each participating entity, the bottle having a storage for storing a message and a mechanism for establishing a temporary transmission link with the server;
   program code for originating a message and storing the message in one of the bottles;
   program code for using a transfer mechanism to transfer a message stored in a first bottle to the server; and
   program code in the server for selecting a participant from the participant list in accordance with criteria determined solely by the server and sending the message received from the first bottle to the bottle controlled by the selected participant.

4. A computer data signal embodied in a carrier wave for playing a game in which a message is passed between a plurality of participating entities, the computer data signal comprising:
   program code in a server for creating a list of participants;
   program code for providing a bottle to each participating entity, the bottle having a storage for storing a message and a mechanism for establishing a temporary transmission link with the server;
   program code for originating a message and storing the message in one of the bottles;
   program code for using a transfer mechanism to transfer a message stored in a first bottle to the server; and
   program code in the server for selecting a participant from the participant list in accordance with criteria determined solely by the server and sending the message received from the first bottle to the bottle controlled by the selected participant.

5. A game apparatus in which a message is passed between a plurality of participating entities, comprising:
   a mobile bottle controlled by each participating entity, the bottle having a storage for storing a message and a wireless transceiver establishing a temporary transmission link with other bottles that are transiently located within a predetermined broadcast area;
   an entry mechanism for originating a message and storing the message in one of the bottles; and
   a transfer mechanism in each bottle which transfers a message received from a first other bottle and stored in that bottle to a second other bottle when a temporary transmission link between that bottle and the second other bottle occurs so that the message is passed fortuitously from bottle to bottle.

6. The game apparatus according to claim 5 wherein each bottle is a hand-held device.

7. The game apparatus according to claim 6 wherein the entry mechanism is a keyboard on the device.

8. The game apparatus according to claim 6 wherein the entry mechanism comprises a computer into which a message is loaded and a mechanism for downloading information from the computer into the device.

9. The game apparatus according to claim 5 wherein the transfer mechanism is a program which transmits the message from the each bottle to the second other bottle.

10. The game apparatus according to claim 5 wherein the wireless transceiver uses radio waves to establish the transmission link.

11. The game apparatus according to claim 5 wherein the wireless transceiver uses infrared signals to establish the transmission link.

12. The game apparatus according to claim 5 further comprising a mechanism for allowing a message recipient to respond to a message originator.

13. The game apparatus according to claim 5 further comprising a mechanism for allowing a message recipient to respond to a message originator.

14. A game apparatus in which a message is passed between a plurality of participating entities, comprising:
   a server containing a list of participants;
   a bottle controlled by each participating entity, the bottle having a storage for storing a message and a mechanism for establishing a temporary transmission link with the server;
   an entry mechanism for originating a message and storing the message in one of the bottles;
   a transfer mechanism which transfers a message stored in a first bottle to the server; and
   a selector in the server that selects a participant from the participant list in accordance with criteria determined solely by the server and sends the message received from the first bottle to the bottle controlled by the selected participant.

15. The game apparatus according to claim 14 wherein each bottle is a hand-held device.

16. The game apparatus according to claim 15 wherein each bottle is a pager.

17. The game apparatus according to claim 15 wherein each bottle is a wireless device.

18. The game apparatus according to claim 15 wherein the entry mechanism is a keyboard on the device.

19. The game apparatus according to claim 15 wherein the entry mechanism comprises a computer into which a message is loaded and a mechanism for downloading information from the computer into the device.

20. The game apparatus according to claim 14 wherein each bottle is a computer.

21. The game apparatus according to claim 14 wherein the transfer mechanism is a network.

22. The game apparatus according to claim 21 wherein the network is the Internet.

23. The game apparatus according to claim 14 wherein the selector in the server randomly selects a participant from the participant list.

24. The game apparatus according to claim 14 wherein the selector in the server selects a participant from the participant list based on a virtual geographic area in which the message recipient is located.

25. The game apparatus according to claim 24 further comprising a mechanism that allows a participant to select a virtual geographic area in which they are located.

26. A method for playing a game in which a message is passed between a plurality of participating entities, comprising:
   (a) providing each participating entity with a mobile bottle controlled by the participating entity;
   (b) using a wireless transceiver in each bottle to establish a temporary transmission link with other bottles that are transiently located within a predetermined broadcast area;
   (c) originating a message and storing the message in one of the bottles; and
   (d) transferring a message received from a first other bottle and stored in a bottle to a second other bottle when a temporary transmission link between that bottle and the second other bottle occurs so that the message is passed fortuitously from bottle to bottle.

27. The method according to claim 26 wherein each bottle is a hand-held device.

28. The method according to claim 27 wherein step (c) comprises entering a message into the device with a keyboard.

29. The method according to claim 27 wherein step (c) comprises entering the message into a computer and downloading information from the computer into the device.

30. The method according to claim 26 wherein step (d) comprises using a program in the bottle to transmit the message from that bottle to the second other bottle.

31. The method according to claim 26 wherein the wireless transceiver uses radio waves to establish the transmission link.

32. The method according to claim 26 wherein the wireless transceiver uses infrared signals to establish the transmission link.

33. The method according to claim 26 further comprising (e) providing a mechanism that allows a message recipient to respond to a message originator.

34. A method for playing a game in which a message is passed between a plurality of participating entities, comprising:
   (a) creating a server containing a list of participants;
   (b) providing a bottle to each participating entity, the bottle having a storage for storing a message and a mechanism for establishing a temporary transmission link with the server;
   (c) originating a message and storing the message in one of the bottles;
   (d) using a transfer mechanism to transfer a message stored in a first bottle to the server; and
   (e) using the server to select a participant from the participant list in accordance with criteria determined solely by the server and send the message received from the first bottle to the bottle controlled by the selected participant.

35. The method according to claim 34 wherein each bottle is a wireless device.

36. The method according to claim 35 wherein the device is a pager.

37. The method according to claim 35 wherein the device is a cell phone.

38. The method according to claim 35 wherein step (c) comprises entering a message into the device with a keyboard.

39. The method according to claim 35 wherein step (c) comprises entering a message into a computer and downloading information from the computer into the device.

40. The method according to claim 34 wherein each bottle is a computer.

41. The method according to claim 34 wherein the transfer mechanism is a network.

42. The method according to claim 41 wherein the network is the Internet.

43. The method according to claim 34 further comprising (f) providing a mechanism that allows a message recipient to respond to a message originator.

44. The method according to claim 34 wherein the server randomly selects a participant from the participant list.

45. The method according to claim 34 wherein the server selects a participant from the participant list based on a virtual geographic area in which the message recipient is located.

46. The method according to claim 45 further comprising (g) providing a mechanism that allows a participant to select a virtual geographic area in which they are located.

* * * * *

UNITED STATES PATENT AND TRADEMARK OFFICE
CERTIFICATE OF CORRECTION

PATENT NO. : 6,659,872 B1  
DATED : December 9, 2003  
INVENTOR(S) : Henry Kaufman, Tinsley A. Galyean, III and Bruce D. Wyman, Jr.

It is certified that error appears in the above-identified patent and that said Letters Patent is hereby corrected as shown below:

Column 9,
Line 1, change "according to claim 5" to -- according to claim 14 --

Signed and Sealed this

Twenty-seventh Day of July, 2004

JON W. DUDAS
*Acting Director of the United States Patent and Trademark Office*